(12) United States Patent
Jersey et al.

(10) Patent No.: US 6,712,497 B2
(45) Date of Patent: Mar. 30, 2004

(54) MATERIAL PROCESSING APPLIANCE AND ASSOCIATED MAGNETIC DRIVE UNIT

(75) Inventors: Steven T. Jersey, Laguna Niguel, CA (US); Michael Saveliev, Huntington Beach, CA (US)

(73) Assignee: Shurflo Pump Manufacturing Co., Inc., Cypress, CA (US)

( * ) Notice: Subject to any disclaimer, the term of this patent is extended or adjusted under 35 U.S.C. 154(b) by 0 days.

(21) Appl. No.: 10/153,156

(22) Filed: May 22, 2002

(65) Prior Publication Data

US 2002/0196705 A1 Dec. 26, 2002

Related U.S. Application Data

(60) Provisional application No. 60/292,640, filed on May 22, 2001.

(51) Int. Cl.[7] .............................. B01F 13/08
(52) U.S. Cl. ............................................ 366/274
(58) Field of Search ........................ 366/205, 206, 366/273, 274, 314; 416/3; 417/420; 310/103–105; 464/29; 99/348; 241/282.1, 282.2

(56) References Cited

U.S. PATENT DOCUMENTS

| | | | | |
|---|---|---|---|---|
| 1,242,493 A | * | 10/1917 | Stringham | |
| 1,420,773 A | * | 6/1922 | Stainbrook | |
| 2,655,011 A | * | 10/1953 | Ihle et al. | |
| 3,279,765 A | * | 10/1966 | Sato et al. | |
| 3,554,497 A | * | 1/1971 | Zipperer | |
| 4,199,265 A | * | 4/1980 | Sanderson et al. | |
| 4,568,195 A | * | 2/1986 | Herz et al. | |
| 4,752,138 A | * | 6/1988 | Rufer | |
| 4,991,973 A | * | 2/1991 | Maaz et al. | |
| 5,529,391 A | * | 6/1996 | Kindman et al. | |
| 5,684,712 A | * | 11/1997 | Goffe et al. | |
| 6,095,677 A | * | 8/2000 | Karkos, Jr. et al. | |
| 6,132,186 A | * | 10/2000 | Cooper et al. | |
| 6,196,712 B1 | * | 3/2001 | Elm | |

FOREIGN PATENT DOCUMENTS

WO 99/12458 * 3/1999

* cited by examiner

*Primary Examiner*—Charles E. Cooley
(74) *Attorney, Agent, or Firm*—Michael Best & Freidrich LLP (57) ABSTRACT

Some embodiments of the present invention provide an apparatus for processing material adjacent to a barrier (e.g., a countertop or other surface), wherein the apparatus includes a container located on one side of the barrier and a stator located on an opposite side of the barrier. A rotor can be located within the container, and can be driven by the stator located on an opposite side of the barrier. In some embodiments, the rotor is free from mechanical connection to the stator, which can be controlled to generate a magnetic field driving the rotor within the container. A processing unit (e.g., one or more blades, whisks, brushes, or other elements) can extend from the rotor and be rotatable by rotation of the rotor. Accordingly, any number of different material processing devices can be driven by the rotor and stator when the rotor is brought into magnetic communication with the stator.

23 Claims, 3 Drawing Sheets

MATERIAL PROCESSING APPLIANCE AND ASSOCIATED MAGNETIC DRIVE UNIT

CROSS-REFERENCE TO RELATED APPLICATIONS

Priority is hereby claimed to U.S. Provisional Patent Application No. 60/292,640 filed on May 22, 2001, the entire disclosure of which is incorporated herein by reference.

BACKGROUND OF THE INVENTION

Many residential and commercial appliances perform specific but similar types of functions, and can share many of the same types of components and systems. For example, many appliances can have similar motors and controls adapted for use in a particular application, such as for mixing fluids and other matter in a blender, mixing material or chemicals in a mixer, cutting food in a food processor, mixing beverage material in a frozen concentrated beverage machine, kneading dough in a breadmaker, mixing ice cream ingredients in an ice cream maker, and the like. For each operation or task, a separate appliance having a separate dedicated drive unit, controls, and other equipment is needed. The residential and commercial appliances typically include bulky motors and electrical cords that clutter and consume counter and storage space. Even though the appliances can be stowed, stowing the appliances necessitates retrieval of the appliance for use.

Appliances that employ the same drive unit for multiple appliances exist, such as in-counter appliance drive units that can be connected to both mixers and blenders. Unfortunately, such appliances employ drive units that have multiple moving parts and connections that are subject to leaking, breakage, and other problems. In addition, the connection between the drive and driven portions of such appliances can be difficult to clean and present an undesirable appearance. Also, the drive units in such appliances having moving parts that are typically loud and can present maintenance issues over time.

Cleanup of appliances and surrounding counters is yet another problem with existing appliances, and can often be time consuming and inefficient. Inadequate cleaning can also cause sanitary problems.

SUMMARY OF THE INVENTION

Some embodiments of the present invention provide an apparatus for processing material adjacent to a barrier (e.g., a countertop or other surface), wherein the apparatus includes a portable container located on one side of the barrier and a stator located on an opposite side of the barrier. A rotor can be located within the portable container, and can be driven by a stator located on an opposite side of the barrier. In some embodiments, the rotor is free from mechanical connection to the stator, which can be controlled to generate a magnetic field that drives the rotor within the container. A processing unit (e.g., one or more blades, a whisk, a brush, or other element) can extend from the rotor and be rotatable by rotation of the rotor. Accordingly, any number of different material processing devices can be driven by the rotor and stator when the rotor is brought into magnetic communication with the stator. Because the drive unit in some embodiments has a stationary stator and no moving parts, a more reliable, quiet, and maintenance-free drive unit can be provided.

In some embodiments of the present invention, a mixing device is provided for mixing comestible material adjacent to a barrier, wherein the mixing device includes a stator having a plurality of windings, a portable container within which comestible material to be mixed is received, a controller coupled to the stator and adapted to be coupled to a power source, and a rotor comprised of magnetic material and located within the portable container and within a magnetic field of the stator. The rotor can be completely separated from the stator by the barrier and can be rotatable about an axis responsive to the magnetic field. The portable container can have at least one position with respect to the barrier in which the rotor is located within the magnetic field. At least one blade located within the portable container and coupled to the rotor can be rotatable about the axis with rotation of the rotor to mix comestible material within the portable container.

In another aspect of the present invention, a method for processing material adjacent to a barrier is provided in which the method includes inserting material within a container, placing the container in a location adjacent to the barrier, generating a magnetic field in a stator located on a side of the barrier opposite the container, changing the magnetic field via a controller coupled to the stator, rotating a rotor free from mechanical attachment to the stator responsive to changing the magnetic field (wherein the rotor is located within the container), rotating a processing unit extending from the rotor, and processing the material within the container by rotation of the processing unit.

Each of the features disclosed herein is included within the scope of the present invention. In addition, all combinations of the presently disclosed features that are not mutually inconsistent or incompatible are also included within the scope of the present invention.

Further features of the present invention, together with the organization and manner of operation thereof, will become apparent from the following detailed description of the invention when taken in conjunction with the accompanying drawings, wherein like elements have like numerals throughout the drawings.

BRIEF DESCRIPTION OF THE DRAWINGS

The present invention is further described with reference to the accompanying drawings, which show exemplary embodiments of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts.

FIG. is a schematic diagram of an exemplary embodiment of the present invention, shown with a blender driven by the drive unit.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein and in the appended claims is meant to encompass the items listed thereafter and equivalents thereof as well as additional items. The terms "connected," "coupled," and "mounted" and variations thereof herein are used broadly and, unless otherwise stated, encompass both direct and indirect connections, couplings, and mountings. In addition, the terms "connected" and "coupled" and variations thereof herein are not restricted to physical and mechanical connections or couplings.

Figure 1:
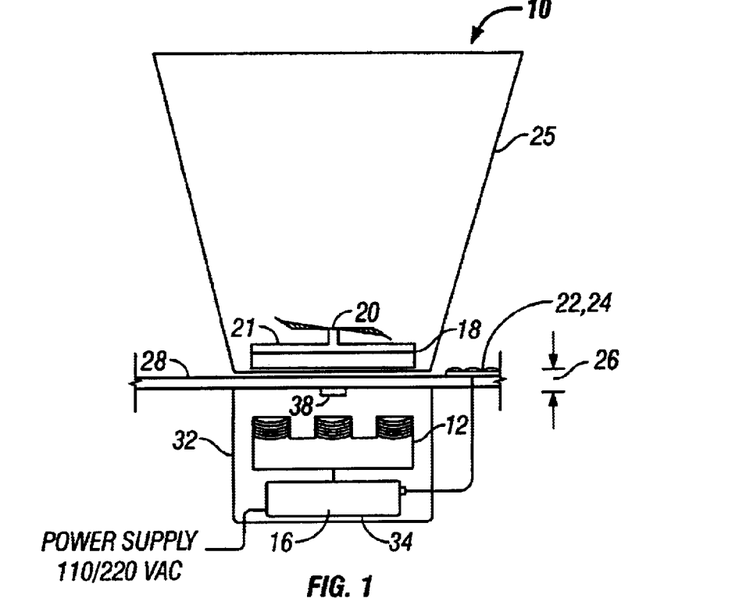

FIG. 1 illustrates a schematic diagram of an exemplary apparatus 10 embodying the present invention. The apparatus 10 illustrated in FIG. 1 includes a drive unit 12, a drive control unit 16 (otherwise referred to herein as a "controller"), a puck 18, a rotational element 20, one or more input 22 and output devices 24, and a container 25. A space 26 that includes a barrier 28 separates the drive unit 12 from the puck 18. Therefore, the drive unit 12 is not mechanically connected with the puck 18. The puck 18 functions as a rotor in the apparatus 10, and is movable in response to a magnetic field generated by the stator 30 (described in greater detail below).

As will be described in greater detail below, the barrier 28 can take a number of different forms, depending at least in part upon the application of the apparatus 10 and the environment in which the apparatus 10 is employed. For example, the barrier 28 can be a countertop in kitchen applications where the apparatus 10 is a blender, food processor, or other kitchen appliance. As another example, the barrier 28 can be a workbench or laboratory table in applications where the apparatus is a chemical mixer.

Figure 2:
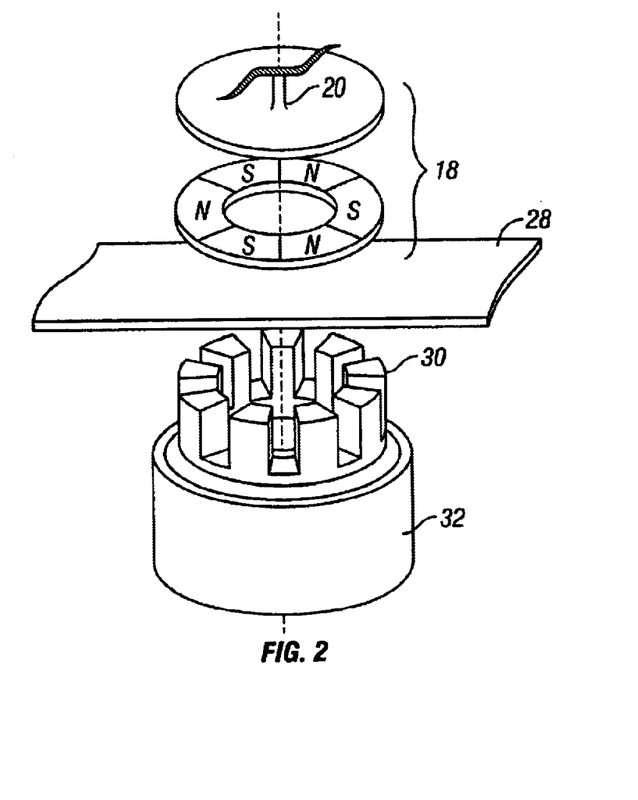
FIG. 2 is an exploded perspective view of part of the drive unit illustrated in FIG 1.

The drive unit 12 drives the rotation of the puck 18. The drive unit 12 can be any device that causes rotation of the puck 18 without physical contact with the puck 18. The device can be powered by various types of power (e.g., one phase, two phase, or three phase power) as desired. Some embodiments of the present invention include an integrated rotor design (IRD) stator 30 for the drive unit 12 as shown in FIG. 2. The IRD stator 30 can include a plurality of stationary magnetic windings positioned to interact through the space 26 with permanent magnetic poles of the puck 18. Upon energization of the windings, the IRD stator 30 generates a magnetomotive force. The magnetomotive force drives the rotation of the puck 18. An exemplary embodiment of an IRD stator 30 that can be employed in the present invention is described in U.S. Pat. No. 6,132,186, entitled "IMPELLER PUMP DRIVEN BY A DYNAMO ELECTRIC MACHINE HAVING A STATOR COMPRISED OF A MASS OF METAL PARTICLES," filed Aug. 6, 1997, the entire contents of which is incorporated herein by reference insofar as they relate to IRD stators, their construction, and their manner of operation. Of course, the apparatus 10 is operable with other types of drives (e.g., other types of brushless direct current drives, magnetic drives, hydraulic drives, etc. which are not shown) that can be operated with variable or constant speed.

With continued reference to the exemplary embodiment shown in FIG. 1, the drive unit 12 can include a housing 32 mounted beneath the barrier 28. Mounting the housing 32 beneath the barrier 28 can protect the drive unit 12 from exposure to material being processed by the puck 18. The housing 32 can mount directly or indirectly to the barrier 28 in any conventional manner (e.g., screws, bolts, adhesives, etc.).

In the embodiment shown in FIG. 1, the housing 32 also encloses the drive control unit 16. The drive control unit 16 can also or instead be provided with a control unit housing 34. In general, the drive control unit 16 communicates with and/or controls the drive unit 12, and can be controlled by and control one or more input devices 22 and/or output devices 24, respectively (if employed). The drive control unit can take a number of different forms, including without limitation a micro-controller, a microprocessor, and analog and/or digital logic circuitry components or combinations thereof. In other embodiments, the drive control unit can be any other conventional control electronics or circuitry capable of energizing the stator 30 to drive the puck 18. Drive control units and associated elements capable of energizing a stator at constant or variable speeds are well-known to those skilled in the art and are not therefore described further herein.

When employed, one or more input devices 22 provide input signals to the apparatus 10. Example input devices 22 include push buttons (e.g., wipe-clean touch panel), switches, sensors (e.g., proximity sensors, touch sensors, temperature sensors, etc.) and other similar devices. Also where employed, one or more output devices 24 provide an interface that allows the apparatus 10 to provide outputs to the operator or to another device connected to the apparatus 10, such as a display, light, or other indicator showing the speed or operational state of the apparatus. Example output devices 24 include a display (e.g., monitor, light emitting diode (LED)), audible indicator, or other communications device.

For example, some embodiments of the invention such as that shown in FIG. 1 include an input device 22 having a wipe clean touch panel mounted on the barrier 28. The touch panel can include user-operable selection buttons for controlling the speed of the rotating element 20, for selecting from a series of pre-programmed speed selections of the drive unit 12 (such as those programmed or otherwise stored in the drive control unit 16), or for selecting operation from a multiple of drive units 12. By operating one or more of the buttons, an operator can activate and/or change operation of the drive unit 12.

In some embodiments, the output device 24 is a display mounted adjacent to the touch panel. The display generates a text message or other indicator for the speed selection or operational mode chosen by the operator. Some embodiments of the present invention enable a user to change the speed of the drive unit 12 via one or more controls of the touch panel 36.

Although the drive control unit 16 can be operated solely under control of input devices 22, in some embodiments other inputs can be electrically connected to the drive control unit 16 in order to activate and/or control the drive control unit. By way of example only, another input device can be employed to detect the presence or position of the container 25 or puck 18 upon the barrier 28. The input device can be a proximity sensor 38, a pressure sensor, a temperature sensor, and the like. In the illustrated embodiment of FIG. 1, this input device is a proximity sensor 38 mounted to the barrier 28 in the vicinity of the drive unit 12. The proximity sensor 38 can send one or more signals to the drive unit 12 when the drive unit 12 is aligned or in sufficient alignment with puck 18, and can thereby activate an indicator indicating proper alignment to the operator.

Upon proper alignment of the puck 18 (and container 25) with the drive unit 12, the operator can press a start button 22 or other start control. Alternatively, the drive control unit can be configured to automatically drive the puck 18 when such an alignment is detected. With reference again to the embodiment of FIG. 1, the start button 22 provides a start signal to the drive control unit 16, and triggers the drive control unit 16 to power the drive unit 12. In those embodiments having variable speed capability, the operator can also control the variable rotational speed of the rotating element 20 with one or more additional input devices 22.

Although an automatic alignment mechanism such as that described above provides some advantages for user operation, in other embodiments the barrier 28 can have one or more indicia (such as one or more lines, circles, or other graphics, one or more areas having different colors or shades compared to surrounding areas of the barrier 28, one or more marks in or on the surface of the barrier 28, and the like) to indicate where the container 25 and puck 18 should be placed for proper puck alignment. Such placement markings aid in properly aligning the axis of rotation of the puck 18 (i.e., the vertical line extending through the center of the puck 18 and the drive unit 12) over the axis of the drive unit 12.

In some embodiments, alignment devices or elements are employed to align the container 25 and puck 18 with the drive unit. For example, some embodiments utilize magnet pairs having a magnet of one polarity located in or under the barrier 28 and a magnet of the opposite polarity located on the container 25. When an operator places the container 25 on the barrier 28 in the vicinity of the drive unit 12, the container 25 removably couples to the barrier 28 in a position that allows for proper alignment of the puck 18 and the drive unit 12.

In general, the puck 18 interacts with the drive unit 12 to rotate the rotating element 20. As discussed above, the exemplary embodiment of the puck 18 includes a plurality of magnetic poles that interact with the magnetic windings of the drive unit 12. In some embodiments as shown in FIG. 2, the puck 18 includes a series of alternating permanent magnetic poles. Any number of alternating magnetic poles can be employed, such as the six alternating magnetic poles illustrated in FIG. 2. The permanent magnetic poles, which are alternating north (N) and south (S) magnetic poles, can be arranged in a circular array and can be positioned to face the IRD stator 30.

In some embodiments, the puck 18 is an integrated structure of individual magnetic segments and has a back layer 21 of magnetic material (i.e., responsive to a magnetic field). The back layer (where employed) can have any shape desired, and in some embodiments has the same shape as the magnetic poles. With reference to FIG. 2 for example, the individual magnetic segments define an annular or ring shape, and the back layer 21 is coextensive with the individual magnetic segments and is perpendicular to the axis of rotation of the puck 18. As an alternative to the disc-shaped layer 21 employed in FIG. 2, the layer 21 can have an annular shape similar to the magnetic poles of the puck 18. In some embodiments, the region or layer of magnetic material (e.g., iron) resides on the region of the puck 18 away from the IRD stator 30. The back layer 21 can enhance the magnetic interaction between the IRD stator 30 and the puck 18. The greater magnetic interaction enhances the ability of the puck 18 to rotate in response to the magnetic windings (not shown) located on the IRD stator 30. Thereby, the enhanced magnetic interaction between the puck 18 and the IRD stator 30 can enhance the power transfer from the IRD stator 30 to the rotating element 20.

In some embodiments, the puck 18 can include a ring magnet in place of the individual magnet segments described above. Like the puck 18 illustrated in FIG. 2, such pucks 18 can have a back layer or region of a magnetic material (e.g., iron). Analogous to the individual magnet segments discussed above, the ring magnet can provide the plurality of permanent magnetic poles. The use of a ring magnet can reduce the weight of the puck 18, the wear and vibration between the puck 18 and the container 25, and the number of parts necessary to generate rotation of the rotating element 20. An exemplary embodiment of a puck 18 that includes a ring magnet is described in U.S. Pat. No. 6,132,186, the entire disclosure of which is incorporated herein by reference insofar as it relates to rotors, rotor magnets, and their manner of construction and operation.

Still other embodiments of the puck 18 include a composite of a thermoplastic polymeric matrix material (e.g., polypropylene, etc.) and particles of strontium ferrite and other materials having similar magnetic properties. In some embodiments, when the strontium ferrite particles are magnetized, the strontium ferrite provides alternating permanent magnetic poles as well as an annular region extending away from the IRD stator 12 having magnetic properties of a magnetic material (e.g., iron). In producing this composite structure of the puck 18, the percentage of each constituent varies according to the desired balance of magnetic and structural properties.

Pucks having a composite structure such as that described above can be formed in a number of different manners. For example, the puck 18 can be manufactured by an injection molding process. With the injection molding process, the mixed constituents can be heated to be flowable and then forced into a closed cavity mold. A magnetizing apparatus is typically positioned appropriately with respect to the mold. While the mixed constituents are still in the mold, the magnetizing apparatus aligns the magnetic particles within the mixed material. In an exemplary embodiment, rather than having flux lines that are perpendicular to the pole face as they pass through the puck 18, the internal flux at the back region (corresponding to the annular region) of the puck 18 is directed to turn parallel to the pole face surface and towards the adjacent opposite polarity poles of the puck 18. Essentially, this change in flux direction creates a flux return path within the puck 18 and can reduce the need for a separate magnetic part (e.g., a back region of magnetic material such as iron).

Although the puck 18 illustrated in FIGS. 1 and 2 is annular or ring-shaped, it should be noted that other puck shapes can be employed for performing the same function as the puck 18. In this regard, each such "puck" still acts as a rotor responsive to the magnetic field generated by the stator 30. Alternative puck shapes include without limitation bar-shaped pucks, rectangular pucks, oval pucks, irregularly shaped pucks, and the like, all of which fall within the spirit and scope of the present invention.

In some embodiments of the present invention, a rotating element 20 is directly or indirectly attached to or is integral with the puck 18, and is rotated by rotation of the puck 18. The rotating element 20 can take a number of different forms, and acts as a workpiece or work assembly to perform an operation on material exposed thereto. As will be described in greater detail below, the rotating element 20 can be one or more blades, whisks, brushes, beaters, hooks, or other elements used for performing a number of different functions associated with the apparatus 10.

The present invention encompasses several different embodiments of a puck 18 coupled to the rotating element 20. In some embodiments (such as that shown in FIG. 1), the puck 18 is directly coupled to the rotating element 20. As used herein, the term "directly coupled" as it relates to the relationship between the rotating element 20 and the puck 18 refers to an apparatus 10 in which the rotating element 20 and the puck 18 are directly secured or attached to one another. Manners of such connection include adhesives, pinned connections, welding, brazing, threaded connections, inter-engaging elements on the rotating element 20 and puck 18, snap-fit or press-fit connections, integral molding, using one or more conventional fasteners such as screws, rivets, bolts, and the like, all of which are known to those skilled in the art.

For example, an exemplary embodiment of the invention includes a puck 18 and rotating element 20 combination molded into a single or integral member. The integrally molded puck 18 and rotating element 20 combination can include both the rotating element 20 and the puck 18 made from the same material, such as the composite material described above. Conventional techniques for integrally molding composite material known to those in the art can be used to form the puck 18 and rotating element 20 combination. The "direct coupling" relationships between the puck 18 and the rotating element 20 described above can reduce the size and space requirements of the puck 18 and rotating element 20 combination, and can reduce the number of components of the apparatus 10.

In operation of the embodiment illustrated in FIGS. 1 and 2, an operator places the puck 18 and rotating element 20 within the container 25, either before or after placing the container 25 in sufficient alignment to drive the puck 18 with the drive unit 12. The container 25 is placed in sufficient alignment to receive the magnetomotive force of the drive unit 12. Upon energization of the IRD stator 30, the magnetic interaction of the puck 18 aligns the puck 18 in the container 25 with the poles of the IRD stator 30. During operation, the magnetic interaction discussed above between the puck 18 and the IRD stator 30 holds the puck 18 and rotating element 20 combination in position in the container 25.

Figure 3:
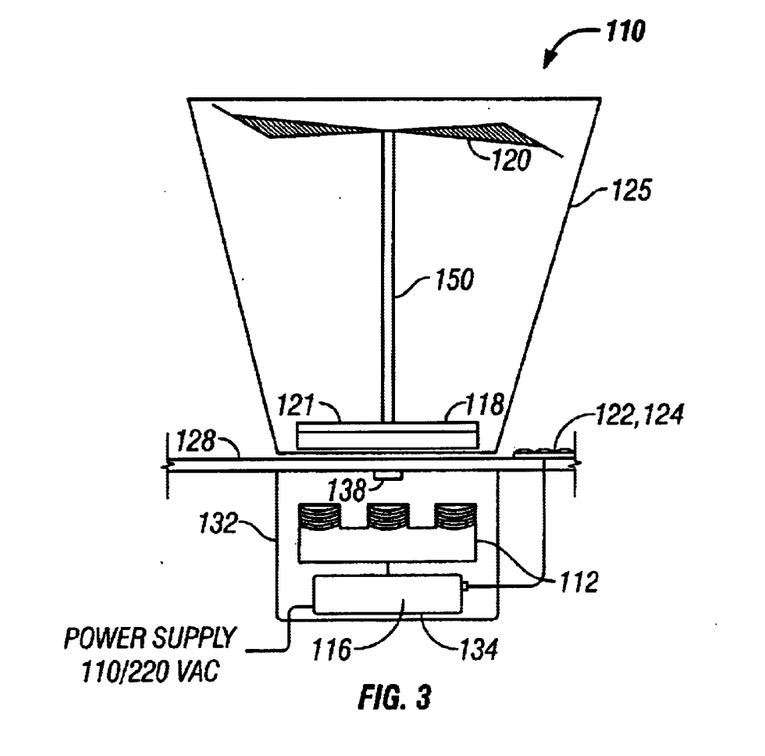
FIG. 3 is a schematic diagram of an exemplary embodiment of the present invention, shown with food processor driven by the drive unit.

An alternative embodiment of a puck and rotating element combination is illustrated by way of example only in FIG. 3. Many of the elements of the embodiment illustrated in FIG. 3 are the same or similar to those used in the embodiment illustrated in FIGS. 1 and 2 (described above) and operate in the same or similar manner. Elements in FIG. 3 that correspond to those in FIGS. 1 and 2 are therefore assigned the same reference numbers increased by 100. Accordingly, with the exception of the differences noted below, the description of the various elements illustrated in FIG. 3 can be found in the description accompanying FIGS. 1 and 2 above.

In embodiment of FIG. 3, a power transmission assembly 150 is connected between the puck 118 and rotating element 120. The power transmission assembly 150 can be a shaft coupled to and extending between the puck 118 and rotating element 120 or can include any number of elements interacting with one another to move the rotating element 120 at the same or different speed as the puck 118. In some embodiments, the rotational motion of the puck 118 can even be transformed to linear motion, reciprocating motion of any type, and still other manners of motion using power transmission assemblies known to those skilled in the art. Accordingly, non-rotating elements 120 also fall within the spirit and scope of the present invention.

The embodiment of the present invention illustrated in FIG. 3 can be employed in a number of different applications. For example, this embodiment can be employed in a food processor utilizing the power transmission assembly 150 to transfer rotation from the puck 118 to one or more cutting or shredding blades 120 located at the top of the container 125. Food material can be fed into the top of the container 125, can be shredded by the rotating blade(s) 120, and can fall to the bottom of the container 125.

It should be noted that in the various embodiments of the present invention, the puck 18 need not necessarily be located within the container 25. In some embodiments, the puck 18 is located outside of the container 25 and can be drivably connected to a rotating element 20 (or other work element) within the container 25 via a drive shaft, power transmission assembly 150 or other power transmission element(s) passing through the bottom or a wall of the container 25. For example, the puck 18 in the illustrated embodiment of FIGS. 1 and 2 can be located beneath the container 25 and can be connected to the rotating element 20 via a power transmission assembly (such as a drive shaft extending from the puck 18 to the inside of the container 25 where it is coupled to the rotating element 20).

Figure 4:
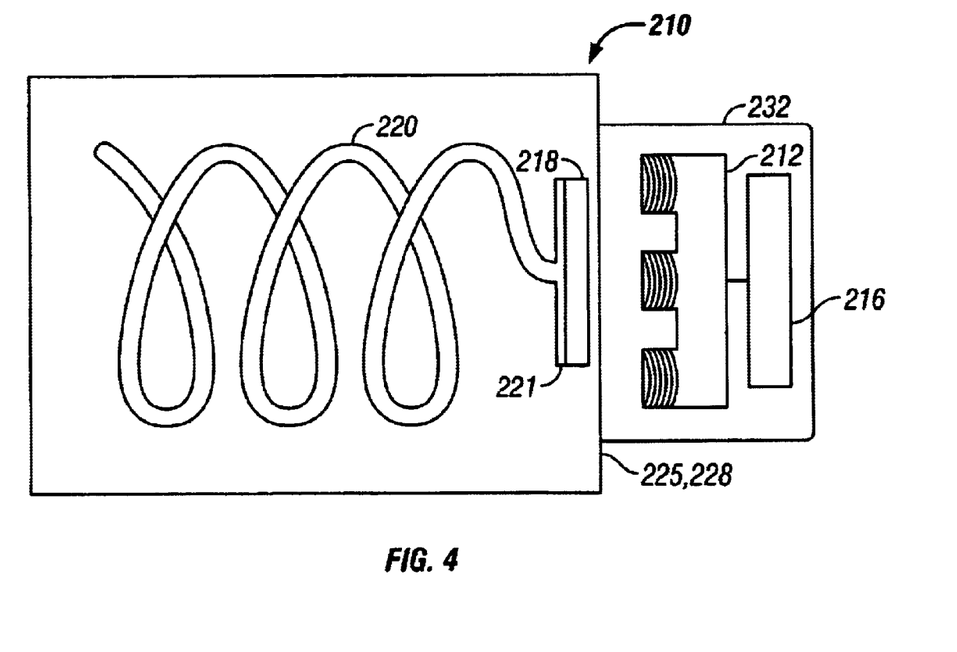
FIG. 4 is a schematic diagram of an exemplary embodiment of the present invention, shown with a frozen concentrated beverage device driven by the drive unit.

Yet another alternative embodiment of a puck and rotating element combination is illustrated by way of example only in FIG. 4. Many of the elements of the embodiment illustrated in FIG. 4 are the same or similar to those used in the embodiment illustrated in FIGS. 1 and 2 (described above) and operate in the same or similar manner. Elements in FIG. 4 that correspond to those in FIGS. 1 and 2 are therefore assigned the same reference numbers increased by 200. Accordingly, with the exception of the differences noted below, the description of the various elements illustrated in FIG. 4 can be found in the description accompanying FIGS. 1 and 2 above.

The apparatus 210 illustrated in FIG. 4 can be employed to prepare, mix, blend or agitate frozen concentrated beverages. In this embodiment, the rotating element 220 is a helical element extending from a puck 218 driven by a stator 230 in a manner as described above. The rotating element 220 can instead be an auger, one or more straight or curved blades extending along part or all of the container 225 (such as along and in contact with the interior walls of the container 225 or in locations between the axis of rotation of the rotating element 220 and the container walls), or can take still other forms.

With reference again to the embodiments of the present invention illustrated in FIGS. 1–4, the barrier 28, 128, 228 between the drive unit 12, 112, 212 and the puck 18, 118, 218 physically separates the drive unit 12, 112, 212 from the puck 18, 118, 218. The barrier 28, 128, 228 can be comprised of any material desired, and in some embodiments is comprised of a material having a reduced magnetic permeability. The reduced magnetic permeability of the barrier 28, 128, 228 allows for greater magnetic interaction between the drive unit 12, 112, 212 and the puck 18, 118, 218. In some embodiments, the barrier 28, 128, 228 comprises a material having a high coefficient of thermal conductivity. The increased thermal conductivity of such a barrier 28, 128, 228 allows for greater dissipation of heat and can enhance the life of the drive unit 12, 112, 212. Examples of materials for the barrier 28, 128, 228 include without limitation stainless steel and other metal, glass, polymeric materials, wood, composites (e.g., CORIAN® brand solid surfaces, Dupont Corporation), granite, marble, and the like.

As mentioned above, the barrier 28, 128, 228 of the present invention can be any material having a thickness that allows the drive unit 12 to interact with and rotate the puck 18, 118, 218. An exemplary embodiment of the barrier 28, 128, 228 is a countertop. Selection of certain countertop materials and/or thinner countertops (at least in the region of the apparatus 10) can help reduce the loss of magnetic field strength through the countertop. For example, a wood or composite countertop can be employed for increased magnetic permeability. Alternatively, a stainless steel countertop can be employed for a higher coefficient of thermal conductivity, easier cleaning, and an attractive appearance. For other barrier materials (e.g., granite, polymeric material, etc.), techniques to reduce the thickness of the countertop known to those in the art can be used to reduce the thickness of the barrier 28, 128, 228 over the drive unit 12, 112, 212 to increase the interaction between the drive unit 12, 112, 212 and the puck 18, 118, 218.

Of course, the barrier 28, 128, 228 can take forms other than a countertop. For example, the barrier 28, 128, 228 can be the top of a housing 32, 132, 232 for the drive unit 12, 112, 212. The top of the housing 32, 132, 232 can lie flush in a cutout of the countertop. As another example, the barrier 28, 128, 228 can be a part of the container 25, 125, 225 itself. In such an embodiment, the housing 32, 132, 232 can mount to the outside of the container 25, 125, 225. In yet another example, the barrier 28, 128, 228 is the top of an elevated surface (e.g., the inside bottom of a cabinet, etc.). In some applications, the housing 32, 132, 232 and drive unit 12, 112, 212 can even be inverted in relation to the puck 18, 118, 218. Such embodiments are analogous to some types of mixing devices (e.g., blenders, breadmakers, etc.) where working elements are powered from above rather than below. Of course, the rotational axes of the drive unit 12, 112, 212 and puck 18, 118, 218 can be oriented in any direction as needed in different applications.

As mentioned above, the rotating elements 20, 120, 220 employed in the present invention perform the desired function of the apparatus 10, 110, 210. The types of rotating elements include cutters (e.g., cutting blades, shredders, etc.) positioned at various angles, mixers (e.g., whisks, prongs, dough hooks, etc.), and numerous devices of the like used in food processing and in other applications. FIG. 1 illustrates a schematic diagram of one embodiment of the rotational element 20 for use in blending or mixing food constituents. FIG. 3 illustrates a schematic diagram of a rotational element 120 also used in food processing (e.g., cutting and slicing food). FIG. 4 illustrates a rotating element 220 for use in a frozen concentrated beverage machine (e.g., for slushes, margaritas, etc.). FIG. 4 also illustrates how the rotational axes of the drive unit 212 and the puck 218 can be oriented in directions that are other than vertical as noted above.

In some embodiments of the present invention, a greater degree of apparatus efficiency is achieved by providing a gap between the puck 18, 118, 218 and the container 25, 125, 225. Fluid entering and passing through this gap can form a film that essentially floats the puck 18, 118, 218, thereby reducing the running friction between the puck 18, 118, 218 and the bottom of the container 25, 125, 225. One source of the liquid can be from food constituents in the container 25, 125, 225. Of course, fluid can also be added between the puck 18, 118, 218 and the container 25, 125, 225, if desired. In some embodiments, grooves are provided on the underside of the puck 18, 118, 218 (facing the drive unit 12, 112, 212) and/or in the bottom surface of the container 25, 125, 225. The grooves can enhance the ability of a fluid film to develop between the puck 18, 118, 218 and the bottom of the container 25, 125, 225. In addition, in some embodiments, the bottom of the container 25, 125, 225 nearest the puck 18, 118, 218 includes a reduced friction coating. For example, the coating can be similar to coatings typically used in cookware (e.g., coatings used to coat non-stick fry pans).

Figure 5:
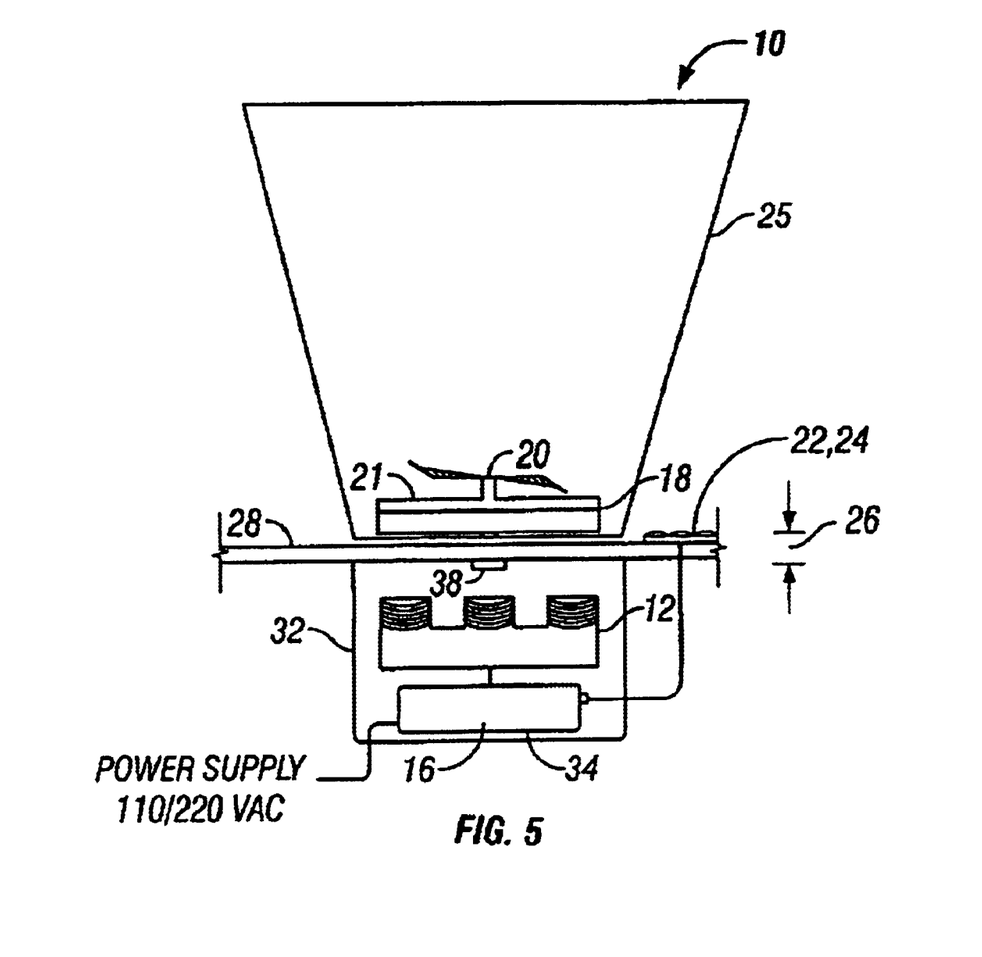
FIG. 5 is a schematic diagram of an alternative exemplary embodiment of the present invention.

As an alternative to a "floating" puck 18, 118, 218 such as those illustrated in FIGS. 1–4, the puck 18, 118, 218 can instead be rotatably connected to the bottom of the container 25, 125, 225 if desired, such as by a pivot shaft rotatably coupled to the bottom of the container 25, 125, 225 and/or to the bottom of the puck 18, 118, 218(see FIG. 5). In such embodiments, a gap between the puck 18, 118, 218 and the container 25, 125, 225 can be employed to reduce the surface area of contacting surfaces and to thereby reduce the frictional loss of the overall apparatus 10, 110, 210. The puck 18, 118, 218 can still be driven to rotate under magnetic force from the stator 12, 112, 212. However, the puck 18, 118, 218 in such cases can rotate about a pivot or other rotational coupler as just described.

Although several of the embodiments described above each have a puck 18, 118, 218 located inside or outside of a container 25, 125, 225 and a work element 20, 120, 220 (e.g., a rotating blade, beater, hook, or other element) in a container 25, 125, 225 connected to and driven by the puck 18, 118, 218, it should be noted that this arrangement of elements can be changed while still falling under the spirit and scope of the present invention. For example, the puck 18, 118, 218 can be secured against rotation to the container 25, 125, 225 (such as to the bottom of the container 25, 125, 225) while a stationary element extending through an aperture in the container 25, 125, 225 can perform the functions described above of the rotating element 20, 120, 220. The puck 18, 118, 218 can even be integral with the container 25, 125, 225 or can be defined by part of the container 25, 125, 225 for this same purpose. In such embodiments, the stator 30, 130, 230 rotates the container 25, 125, 225 while a stationary blade, whisk, beater, or other element attached to a shaft extending into the container 25, 125, 225 acts upon material within the container 25, 125, 225.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, several of the embodiments described above employ a container 25, 125, 225 within which material to be processed is received. The container 25, 125, 225 can have any shape and size. For example, the container 25, 125, 225 can be somewhat elongated in blender applications, can be significantly wider than deep for applications in which the driven element 20, 120, 220 is a rotating brush in a glass cleaning apparatus, can be cylindrical with relatively straight sides in a frozen concentrated beverage making apparatus, can be bowl-shaped in a mixer apparatus, and the like.

As another example, the present invention is well-suited for application in a number of different kitchen appliances such as those mentioned above. However, the present invention is not limited to kitchen appliance applications, and can be employed in many other applications. By way of example only, the present invention can be employed in chemical mixing applications or in material polishing and grinding applications. As another example, the present invention can be employed in glass or bottle washing applications. In such cases, the barrier 28 can be the lower portion of a sink or basin, whereby the puck 18 and rotating element 20 combination can be located at the bottom of the sink while the housing 32 and drive unit 12 can be mounted beneath the sink. For such embodiments, the rotating element 20 can include a brush or sponge sized and shaped to fit inside glasses and bottles to be cleaned. All such alternative applications fall within the spirit and scope of the present invention.

What is claimed is:

1. An apparatus for processing comestible material adjacent to a barrier, the apparatus comprising:

a portable container located on one side of the barrier, the portable container having a bottom and an open top through which comestible material can be introduced into the portable container, the portable container removable from a location with respect to the barrier;

a stator located on an opposite side of the barrier;

a rotor located inside the portable container, the rotor including a plurality of permanent magnets arranged in a ring, the rotor free from mechanical connection to the stator, positioned within the portable container in a location to be immersed within the material to be processed, and positioned at least partially inside a magnetic field generated by the stator, the rotor rotatable about an axis within the portable container responsive to the magnetic field generated by the stator;

a controller coupled to the stator, the controller operable to energize the stator and to produce the magnetic field;

processing means coupled to the rotor and operable by rotation of the rotor to process the comestible material in the portable container; and a sensor located adjacent the barrier, the sensor situated to sense the position of the rotor with respect to the stator.

2. The apparatus as claimed in claim 1, wherein the processing means is at least one blade.

3. The apparatus as claimed in claim 1, wherein the barrier completely separates the portable container from the stator.

4. The apparatus as claimed in claim 1, wherein the rotor is rotatably coupled to the portable container.

5. The apparatus as claimed in claim 1, wherein the location is upon and atop the barrier.

6. The apparatus as claimed in claim 1, wherein the plurality of permanent magnets are encased within the rotor.

7. The apparatus as claimed in claim 1, wherein the rotor is free from mechanical connection with the portable container and is removable from the portable container.

8. The apparatus as claimed in claim 1, wherein:

the barrier is a countertop;

the stator is located beneath the countertop; and the location is upon and atop the countertop.

9. A mixing device for mixing comestible material adjacent to a barrier, the mixing device comprising:

a stator having a plurality of windings;

a portable container within which comestible material to be mixed is received;

a controller coupled to the stator and adapted to be coupled to a power source, the controller operable to energize the windings of the stator to produce a changing magnetic field about the stator;

a rotor having a ring shape comprised of alternating permanent magnets located within the magnetic field, and completely separated from the stator by the barrier, the rotor free floating inside the portable container and rotatable about an axis responsive to the magnetic field, the portable container having at least one position with respect to the barrier in which the rotor is located within the magnetic field, the portable container being removable from the at least one position; and at least one blade located within the portable container and coupled to the rotor, the at least one blade rotatable about the axis with rotation of the rotor to mix comestible material within the portable container.

10. The mixing device as claimed in claim 9, wherein the at least one position is upon and atop the barrier.

11. The mixing device as claimed in claim 9, wherein the alternating permanent magnets are encased within the rotor.

12. The mixing device as claimed in claim 9, wherein the rotor is free from mechanical connection with the container and is removable from the container.

13. The mixing device as claimed in claim 9, wherein:

the barrier is at least partially defined by a countertop;

the stator is located beneath the countertop; and the at least one position is upon and atop the countertop.

14. A method of processing material adjacent to a barrier, the method comprising:

inserting material within a portable container;

placing the portable container in a location adjacent to the barrier;

generating a magnetic field in a stator located on a side of the barrier opposite the portable container, the stator having a plurality of windings;

providing a controller coupled to the stator and adapted to be coupled to a power source, the controller operable to energize the windings of the stator to produce a changing magnetic field about the stator;

changing the magnetic field via said controller coupled to the stator;

rotating a rotor free from mechanical attachment to the stator responsive to changing the magnetic field, free floating limitation the rotor rotatable about an axis, completely separated from the stator by the barrier, having a plurality of alternating permanent magnets arranged in a ring located within the magnetic field, and located within the portable container, the portable container having at least one position with respect to the barrier in which the rotor is located within the magnetic field, the portable container being removable from the at least one position;

rotating a processing unit about the axis and within the portable container, the processing unit comprised of at least one of a blade, whisk, brush, shredder, prong and dough hook extending from the rotor; and processing the material within the portable container by rotation of the processing unit with the rotor.

15. The method as claimed in claim 14, wherein placing the portable container includes resting the container upon and atop the barrier.

16. The method as claimed in claim 15, wherein the stator is located beneath the barrier.

17. The method as claimed in claim 14, wherein the barrier is at least partially defined by a countertop, and wherein placing the portable container includes placing the portable container upon the countertop.

18. The method as claimed in claim 14, wherein processing the material includes cutting the material.

19. The method as claimed in claim 14, wherein processing the material includes mixing the material.

20. The method as claimed in claim 14, further comprising inserting the rotor within the portable container.

21. The method as claimed in claim 20, further comprising immersing the rotor within material to be processed in the portable container.

22. The method as claimed in claim 14, further comprising removing the portable container from the location adjacent to the barrier.

23. An apparatus for mixing comestible material adjacent to a barrier, the mixing device comprising:

- a portable container within which comestible material to be mixed is received, the portable container removable from a location with respect to the barrier;
- a stator located on an opposite side of the barrier, the stator having a plurality of windings;
- a rotor located inside the portable container and immersed in the comestible material to be mixed, the rotor having a plurality of alternating permanent magnets arranged in a ring, free from mechanical connection to the stator, located at least partially inside a changing magnetic field generated by the stator, completely separated from the stator by the barrier, and rotatable about a substantially horizontal axis within the portable container responsive to the magnetic field generated by the stator;
- a controller coupled to the stator and adapted to be coupled to a power source, the controller operable to energize the windings of the stator and to produce the magnetic field;
- processing means located within the portable container, coupled to the rotor, and operable by rotation of the rotor and the processing means about the axis to process the comestible material in the portable container.

* * * * *